US010496674B2

(12) United States Patent
Sipka et al.

(10) Patent No.: US 10,496,674 B2
(45) Date of Patent: Dec. 3, 2019

(54) SELF-DESCRIBING VOLUME ANCESTRY FOR DATA SYNCHRONIZATION

(71) Applicant: International Business Machines Corporation, Armonk, NY (US)

(72) Inventors: Andrea Sipka, Chandlers Ford (GB); John P. Wilkinson, Salisbury (GB)

(73) Assignee: International Business Machines Corporation, Armonk, NY (US)

(*) Notice: Subject to any disclaimer, the term of this patent is extended or adjusted under 35 U.S.C. 154(b) by 180 days.

(21) Appl. No.: 15/670,776

(22) Filed: Aug. 7, 2017

(65) Prior Publication Data

US 2019/0042636 A1    Feb. 7, 2019

(51) Int. Cl.

| G06F 17/00 | (2019.01) |
| G06F 16/27 | (2019.01) |
| H04L 29/08 | (2006.01) |
| G06F 16/178 | (2019.01) |
| G06F 11/14 | (2006.01) |

(52) U.S. Cl.
CPC .......... *G06F 16/273* (2019.01); *G06F 16/178* (2019.01); *G06F 16/27* (2019.01); *H04L 67/1095* (2013.01); *G06F 11/1451* (2013.01); *G06F 11/1464* (2013.01)

(58) Field of Classification Search
None
See application file for complete search history.

(56) References Cited

U.S. PATENT DOCUMENTS

| 7,996,636 | B1 | 8/2011 | Prakash et al. | |
| 9,069,827 | B1* | 6/2015 | Rath | G06F 16/25 |
| 9,329,801 | B1* | 5/2016 | Byrd | G06F 3/0668 |
| 2007/0198602 | A1* | 8/2007 | Ngo | G06F 3/061 |
| 2008/0244028 | A1* | 10/2008 | Le | G06F 3/0607 709/208 |
| 2013/0013566 | A1* | 1/2013 | Miller | G06F 11/2069 707/655 |

(Continued)

OTHER PUBLICATIONS

"Administering block storage replication," available at: http://www.ibm.com/support/knowledgecenter/SSCR9A_2.1.1/doc/iwd/drc_admin_block_storage_replication.html, publication date no later than Feb. 10, 2017.

(Continued)

*Primary Examiner* — Hung D Le

(74) *Attorney, Agent, or Firm* — Nelson and Nelson; Daniel P. Nelson; Alexis V. Nelson

(57) ABSTRACT

A method to efficiently synchronize a secondary volume with a primary volume includes maintaining a primary volume on a primary storage system and creating a copy of the primary volume. Ancestry information is maintained for the primary volume and copy. The copy and associated ancestry information are physically transported from the primary storage system to a secondary storage system. The copy is loaded into a secondary volume of the secondary storage system and the ancestry information of the copy is imported into the secondary volume. The ancestry information is then analyzed to determine if the primary volume and secondary volume share common ancestry. If so, the ancestry information is analyzed to determine differences between the primary volume and the secondary volume. The secondary volume is then synchronized with the primary volume to reconcile the differences. A corresponding system and computer program product are also disclosed.

20 Claims, 9 Drawing Sheets

(56) References Cited

U.S. PATENT DOCUMENTS

| | | | |
|---|---|---|---|
| 2013/0080722 A1* | 3/2013 | Sano | G06F 11/1443 |
| | | | 711/162 |
| 2013/0191345 A1* | 7/2013 | Banerjee | G06F 16/11 |
| | | | 707/649 |
| 2013/0332505 A1* | 12/2013 | Karandikar | H04L 67/1002 |
| | | | 709/202 |
| 2013/0346426 A1 | 12/2013 | O'byrne | |
| 2014/0108349 A1* | 4/2014 | Benhase | G06F 11/2082 |
| | | | 707/639 |
| 2014/0181016 A1* | 6/2014 | Whitehead | G06F 11/00 |
| | | | 707/613 |
| 2014/0351214 A1 | 11/2014 | Abercrombie et al. | |
| 2015/0161194 A1 | 6/2015 | Provenzano et al. | |
| 2015/0268864 A1 | 9/2015 | Bernat et al. | |
| 2016/0150012 A1 | 5/2016 | Barszczak et al. | |
| 2016/0203055 A1* | 7/2016 | Dain | G06F 11/1453 |
| | | | 714/6.24 |
| 2016/0224441 A1* | 8/2016 | Arnold | G06F 11/1662 |
| 2016/0328303 A1* | 11/2016 | Brandner | G06F 11/1662 |
| 2018/0157421 A1* | 6/2018 | Brown | G06F 3/0604 |

\* cited by examiner

Origin Journal for Volume ID0001

| Volume Identifier | Operation | Data Generation |
|---|---|---|
| ID0001 | Initial Creation | 0 |
|  |  |  |
|  |  |  |
|  |  |  |
|  |  |  |
|  |  |  |
|  |  |  |

Fig. 4A

Origin Journal for Volume ID0001

| Volume Identifier | Operation | Data Generation |
|---|---|---|
| ID0001 | Initial Creation | 2 |
|  |  |  |
|  |  |  |
|  |  |  |
|  |  |  |
|  |  |  |
| ID0002 | Point-in-Time Copy Taken | 1 |

Fig. 4B

Origin Journal for Volume ID0002

| Volume Identifier | Operation | Data Generation |
|---|---|---|
| ID0001 | Initial Creation | 1 |
| ID0002 | Point-in-Time Copy Taken | 1 |
|  |  |  |
|  |  |  |
|  |  |  |
|  |  |  |
|  |  |  |

Fig. 5A

Origin Journal for Volume ID0001

| Volume Identifier | Operation | Data Generation |
|---|---|---|
| ID0001 | Initial Creation | 2 |
|  |  |  |
|  |  |  |
|  |  |  |
| ID0004 | Continuous Copy | Invalid |
| ID0003 | Point-in-Time Copy Taken | 2 |
| ID0002 | Point-in-Time Copy Taken | 1 |

Fig. 5B

Origin Journal for Volume ID0001

| Volume Identifier | Operation | Data Generation |
|---|---|---|
| ID0001 | Initial Creation | 3 |
|  |  |  |
|  |  |  |
|  |  |  |
| ID0004 | Continuous Copy | 3 |
| ID0003 | Point-in-Time Copy Taken | 2 |
| ID0002 | Point-in-Time Copy Taken | 1 |

Fig. 6A

Origin Journal for Volume ID0004

| Volume Identifier | Operation | Data Generation |
|---|---|---|
| ID0001 | Initial Creation | 3 |
| ID0004 | Continuous Copy | 3 |
|  |  |  |
|  |  |  |
|  |  |  |
|  |  |  |
|  |  |  |

Fig. 6B

Origin Journal for Volume ID0001

| Volume Identifier | Operation | Data Generation |
|---|---|---|
| ID0001 | Initial Creation | 4 |
| | | |
| | | |
| | | |
| ID0004 | Continuous Copy | 3 |
| ID0003 | Point-in-Time Copy Taken | 2 |
| ID0002 | Point-in-Time Copy Taken | 1 |

Fig. 7A

Origin Journal for Volume ID0004

| Volume Identifier | Operation | Data Generation |
|---|---|---|
| ID0001 | Initial Creation | 3 |
| ID0004 | Continuous Copy | 4 |
| | | |
| | | |
| | | |
| | | |
| | | |

Fig. 7B

Origin Journal for Volume ID0004

| Volume Identifier | Operation | Data Generation |
|---|---|---|
| ID0001 | Initial Creation | 4 |
| ID0004 | Continuous Copy | 4 |
|  |  |  |
|  |  |  |
|  |  |  |
|  |  |  |
|  |  |  |

Fig. 8

| ROIs for volume ID0001 | ROIs for volume ID0002 |
|---|---|
| ID0001-0 | ID0002-0 |
| ID0001-0 | ID0002-0 |
| ID0001-0 | ID0002-0 |

Fig. 9A

| ROIs for volume ID0001 | ROIs for volume ID0002 |
|---|---|
| ID0001-1 | ID0002-0 |
| ID0001-0 | ID0002-0 |
| ID0001-0 | ID0002-1 |

Fig. 9B

| ROIs for volume ID0001 | ROIs for volume ID0002 |
|---|---|
| ID0001-2 | ID0001-1 |
| ID0001-0 | ID0001-0 |
| ID0001-2 | ID0001-0 |

Fig. 9C

| ROIs for volume ID0001 | ROIs for volume ID0002 |
|---|---|
| ID0001-3 | ID0002-2 |
| ID0001-0 | ID0001-0 |
| ID0001-2 | ID0002-2 |

Fig. 9D

SELF-DESCRIBING VOLUME ANCESTRY FOR DATA SYNCHRONIZATION

BACKGROUND

Field of the Invention

This invention relates to systems and methods for efficiently synchronizing volumes in data replication environments.

Background of the Invention

In data replication environments such as Peer-to-Peer-Remote-Copy ("PPRC") environments, data is mirrored from a primary storage system to a secondary storage system to maintain two consistent copies of the data. The primary and secondary storage systems may be located at different sites, perhaps hundreds or even thousands of miles away from one another. In the event the primary storage system fails, I/O may be redirected to the secondary storage system, thereby enabling continuous operations. When the primary storage system is repaired, I/O may be redirected back to the primary storage system.

When setting up a data replication environment, an initial copy of data may be physically transported on portable storage media (e.g., magnetic tape, etc.) from the primary storage system to the secondary storage system. This initial copy may be loaded onto the secondary storage system. This technique preserves bandwidth between the primary storage system and secondary storage system. Once loaded on the secondary storage system, the copy may be used to seed replication between the primary and secondary storage systems.

Often, changes occur to data at the primary storage system before the initial copy has been transported to and loaded into the secondary storage system. Thus, some updating of the copy at the secondary storage system may be needed to completely synchronize the primary storage system with the secondary storage system. This procedure requires careful use of the storage system's options to avoid resynchronization of data that was physically moved to the secondary site, but enabling synchronization of any later changes applied at the primary site. These options need to be applied in the correct circumstances, as otherwise a system may believe a secondary copy matches a primary copy when in fact it does not. This situation may be hard to detect and hard to recover from without completely re-setting up the data replication environment, including physically transporting a copy to the secondary storage system.

In view of the foregoing, what are needed are techniques to physically transport data to a target of replication, automatically identify the data as an earlier instance of the source of the replication, and copy a minimum of changes from the source to the target to achieve full synchronization. Ideally, the data replication system will not require an explanation of how to accomplish the synchronization, but rather be able to determine this for itself.

SUMMARY

The invention has been developed in response to the present state of the art and, in particular, in response to the problems and needs in the art that have not yet been fully solved by currently available systems and methods. Accordingly, the invention has been developed to efficiently synchronize a secondary volume with a primary volume in a data replication environment. The features and advantages of the invention will become more fully apparent from the following description and appended claims, or may be learned by practice of the invention as set forth hereinafter.

Consistent with the foregoing, a method to efficiently synchronize a secondary volume with a primary volume is disclosed. In one embodiment, such a method includes maintaining a primary volume on a primary storage system and creating a copy of the primary volume. Ancestry information is maintained for the primary volume and copy. The copy and associated ancestry information are physically transported from the primary storage system to a secondary storage system. The copy is loaded into a secondary volume of the secondary storage system and the ancestry information of the copy is imported into the secondary volume. The ancestry information is then analyzed to determine if the primary volume and secondary volume share common ancestry. In the event the primary volume and secondary volume share common ancestry, the ancestry information is analyzed to determine differences between the primary volume and the secondary volume. The secondary volume is then synchronized with the primary volume to reconcile the differences.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIGS. 4A through 8 show how ancestry and descendant information may be maintained for volumes; and FIGS. 9A through 9D show how region origin identifiers (ROIs) may be maintained and used to determine which regions are common between volumes.

DETAILED DESCRIPTION

Figure 1:
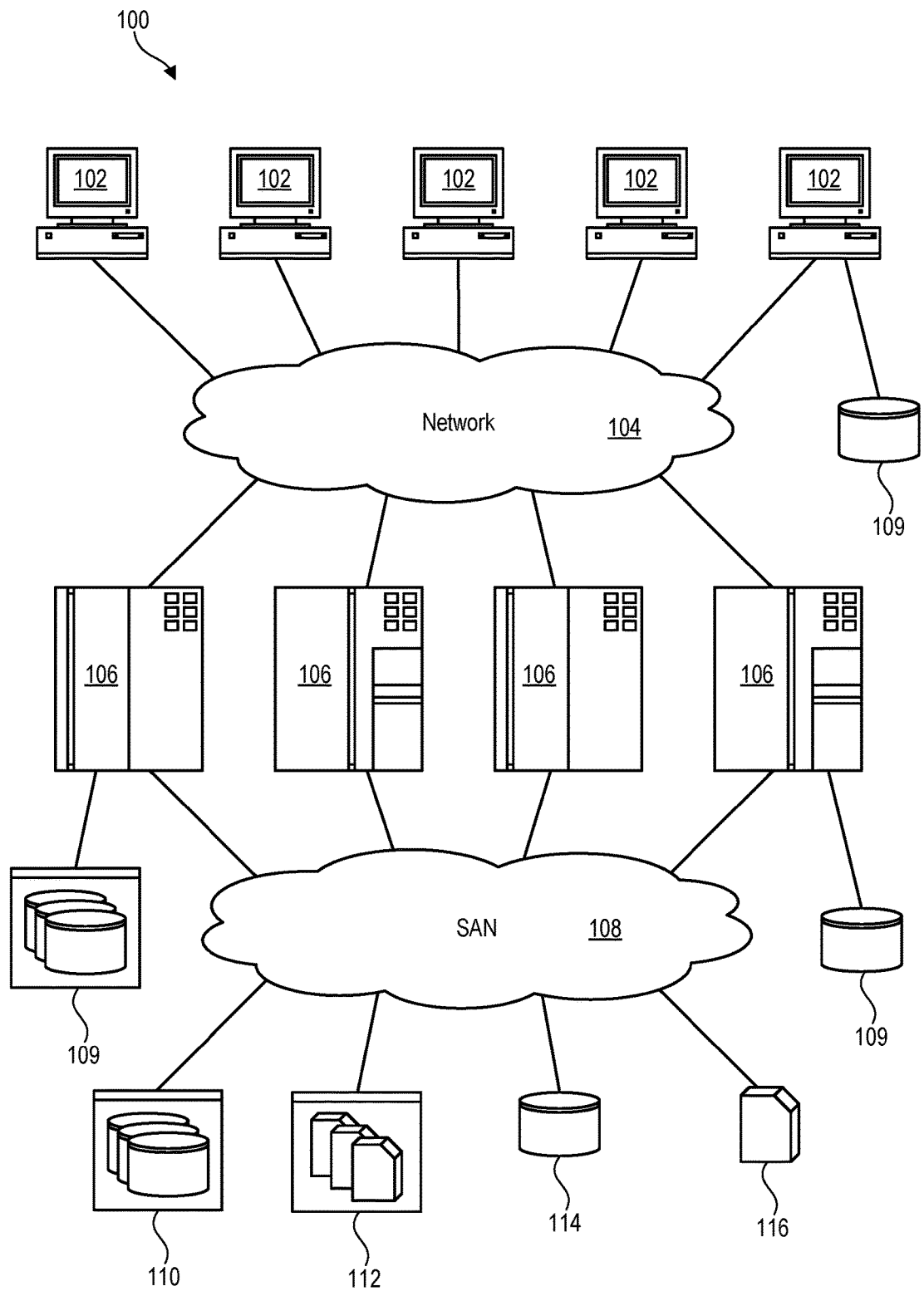
FIG. 1 is a high-level block diagram showing one example of a network environment in which systems and methods in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
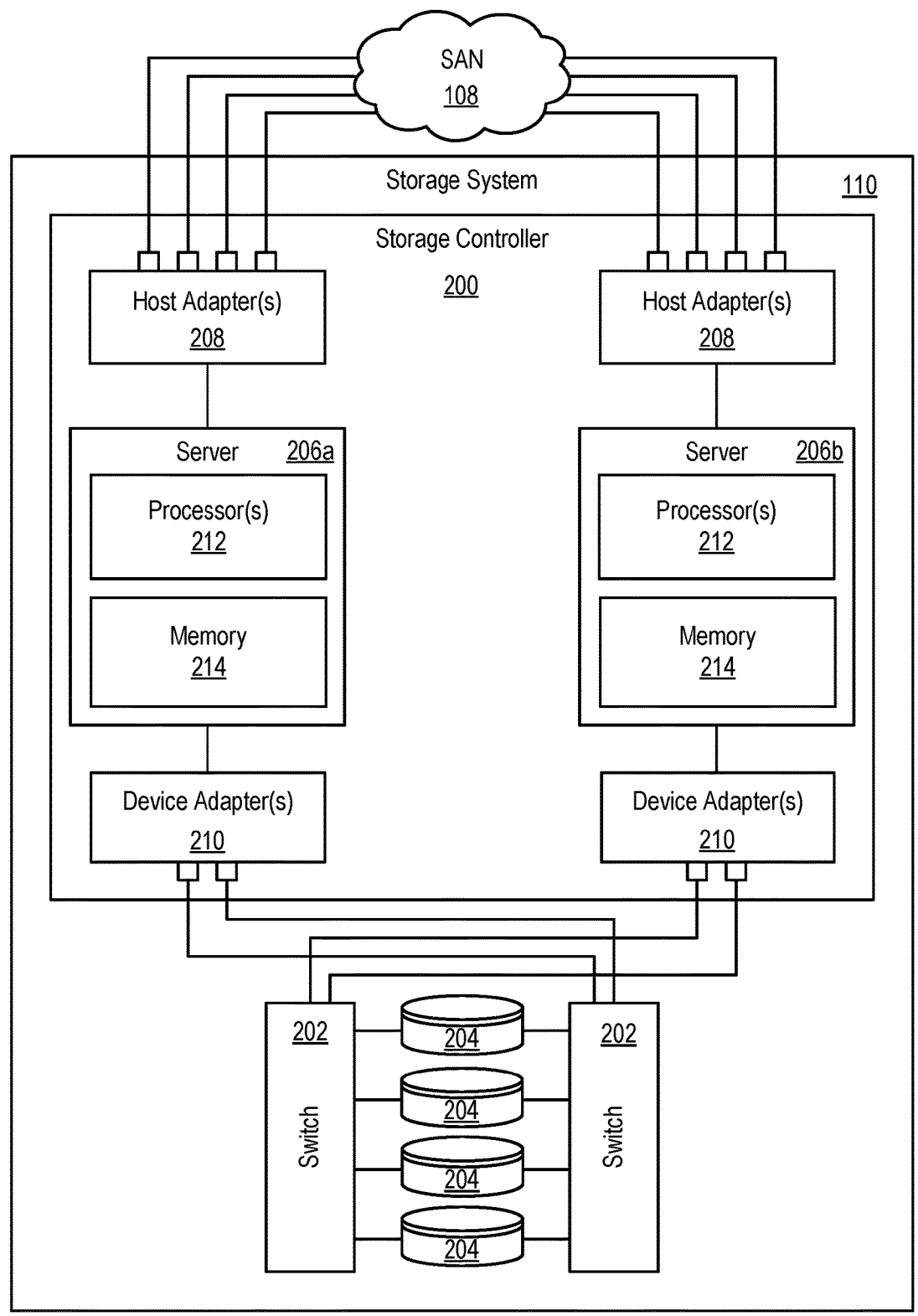
FIG. 2 is a high-level block diagram showing one example of a storage system that may function as a primary or secondary storage system in a data replication environment.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such as z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
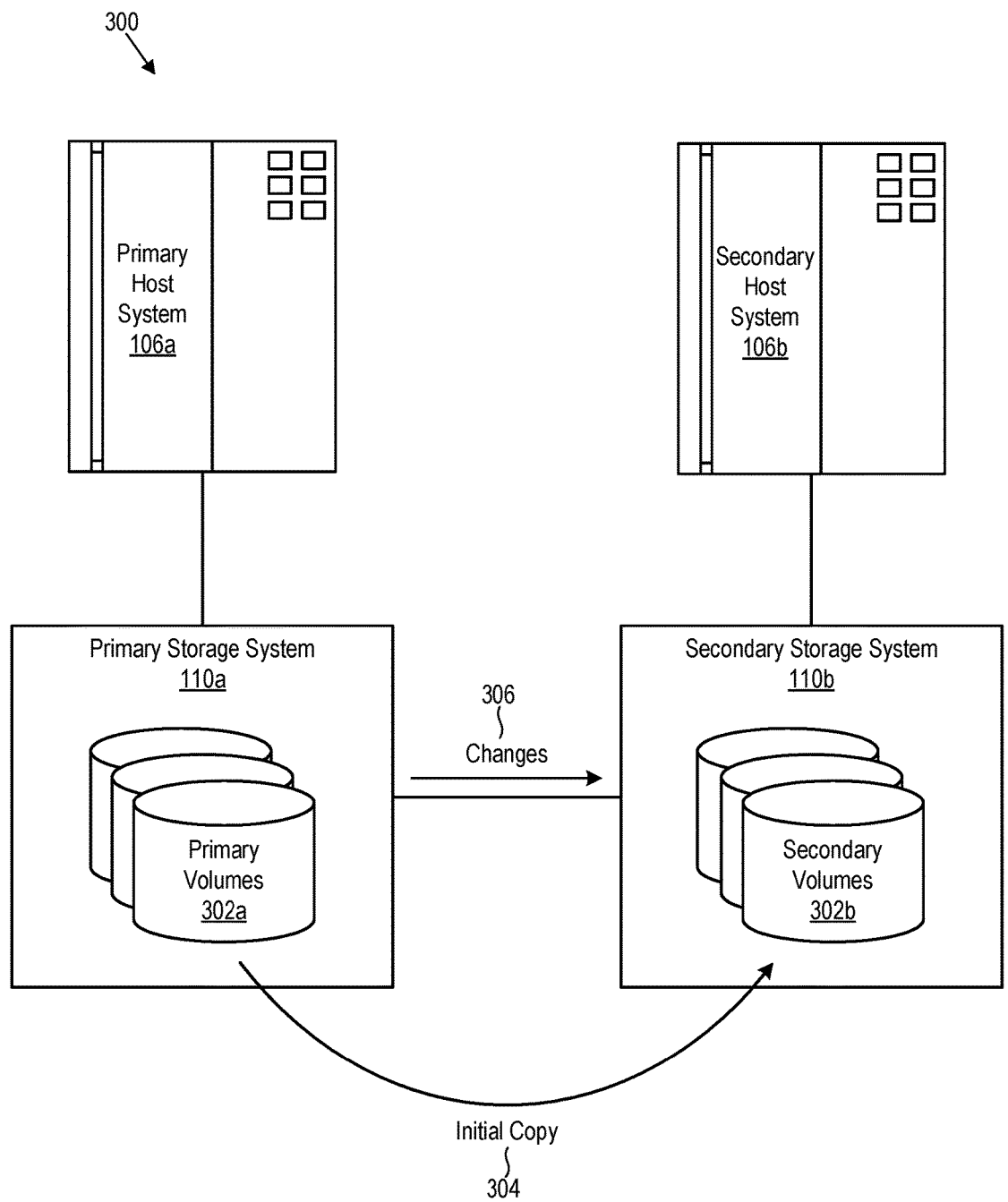
FIG. 3 is a high-level block diagram showing setting up a data replication environment.

Referring to FIG. 3, in certain embodiments, a storage system 110 like that illustrated in FIG. 2 may be incorporated into a data replication system 300 such as that illustrated in FIG. 3. In such a data replication systems 300, data may be mirrored from primary volumes 302a of a primary storage system 110a to secondary volumes 302b of a secondary storage system 110b to maintain two consistent copies of data. A primary host system 106a and secondary host system 106b may be coupled to the primary storage system 110a and secondary storage system 110b respectively. The primary and secondary storage systems 110a, 110b may be located at different sites, perhaps hundreds or even thousands of miles away from one another. In the event the primary storage system fails, I/O may be redirected to the secondary storage system 110b, thereby enabling continuous operations. When the primary storage system 110a is repaired, I/O may be redirected back to the primary storage system 110a.

When setting up a data replication system 300, an initial copy 304 of data may in certain cases be physically transported on portable storage media (e.g., magnetic tape, etc.) from the primary storage system 110a to the secondary storage system 110b. This initial copy 304 may be loaded onto the secondary storage system 110b. This technique preserves bandwidth between the primary storage system 110a and the secondary storage system 110b. Once loaded on the secondary storage system 110b, the initial copy 304 may be used to seed replication between the primary and secondary storage systems 110a, 110b.

Often, changes occur to data at the primary storage system 110a before the initial copy 304 has been transported to and loaded into the secondary storage system 110b. Thus, some updating of the copy at the secondary storage system 110b may be needed to fully synchronize the primary storage system 110a with the secondary storage system 110b. This procedure requires careful use of the storage system's options to avoid resynchronization of data that was physically moved to the secondary site, but enabling synchronization of any later changes 306 applied at the primary site. These options need to be applied in the correct circumstances, as otherwise a system may believe a secondary copy matches a primary copy when in fact it does not. This situation may be hard to detect and hard to recover from without completely reconfiguring the data replication system 300, including physically transporting a copy to the secondary storage system 110b.

As a result, systems and techniques are needed to physically transport data 304 to a target 302b of replication, automatically identify the data 304 as an earlier instance of the source 302a of the replication, and copy a minimum of changes 306 from the source 302a to the target 302b to achieve full synchronization. Ideally, the data replication system 300 will not require an explanation of how to use the data, but rather be able to determine this for itself.

Systems and methods in accordance with the invention may satisfy two key requirements. First, systems and methods in accordance with the invention may indicate whether two volumes 302a, 302b share common ancestry without a byte-by-byte comparison of the two volumes 302a, 302b. Second, systems and methods in accordance with the invention may indicate which regions in the volumes 302a, 302b differ, and which copy is the later version of the data, again without having to perform a byte-by-byte comparison.

It is possible, and fairly straightforward, to implement an initial synchronization method that can identify and transmit only changed portions of a volume 302 with minimum overhead. Such a method typically has the disadvantage of requiring reading all of the data of both copies 302a, 302b, which might not otherwise be required. As typical volume sizes increase, this requirement to read both copies 302a, 302b becomes more of an issue.

When a volume 302 is created, metadata may be stored within the volume 302 that contains a unique origin identifier. This origin identifier may contain a universally unique identifier (UUID) constructed such that collisions are not possible within a storage system 110 or between multiple storage systems 110. As long as the origin identifier is retained as the volume 302 is copied, imported, and exported, it may be common to all copies that are generated from it.

If a volume 302 is imported from outside a storage system 110, it may retain an origin identifier if it came from a storage system 110 that supports origin identifiers. Otherwise, it may be assigned a new origin identifier. If the volume 302 is copied from another volume 302, for example through a whole-volume point-in-time copy, or through a whole-volume continuous replication, and the target volume 302b has no origin identifier or a different origin identifier from the source volume 302a, the target volume 302b may be assigned the same origin identifier as the source volume 302a. If partial-volume copying is supported (such as in IBM DS8000™ series FlashCopy™), multiple origin identifiers may be needed to record the original volume from which each part originated. If two volumes 302a, 302b have different origin identifiers, they have no common ancestry, and systems and methods in accordance with the invention may be unable to optimize copy services between them.

A volume 302 may also be assigned a volume identifier, stored in metadata within the volume 302, which defines the particular volume 302. This volume identifier may be distinct between volumes 302 that share the same ancestry. The volume identifier may contain a UUID, perhaps together with user-readable information, such as the volume's name.

In certain embodiments, metadata associated with a volume 302 includes an origin journal, which may contain records indicating how the volume 302 was created from the earliest origin of the data (the volume's ancestors), along with records of copies generated from the volume (the volume's descendants). Each record may describe some transformation, such as the start of replication to a different system, or triggering of a point-in-time snapshot of the volume 302. The record may include a volume identifier of the volume 302 created by the transformation. In certain embodiments, the metadata may further indicate an amount of write activity occurring between records in the origin journal, which may indicate whether multiple copies contain identical data. The metadata may include an entry describing the current state of the volume 302, and whether any write activity has occurred since the last entry. In certain embodiments, if a source volume 302a is replicated to a target volume 302b, the metadata of the source volume 302a may record whether the source volume 302a has been modified such that it is out of synchronization with the target volume 302b and, if so, by how many writes.

In certain embodiments, a storage system 110 may periodically update write counts for each volume 302. Counts of zero and one may be recorded immediately to indicate a volume's state (whether it has been modified or remains unmodified), but above one, may only be recorded every number (e.g., thousand) of input/output operations (IOPs) or minute, depending on what recovery point objective (RPO) and granularity is needed.

Ancestors in an origin journal of a volume 302 may be constant throughout the life of a volume 302 and only change if data is copied to the volume 302 from another volume 302. Descendants may change as copies are made from the volume 302. In certain embodiments, the origin journal may be implemented so that ancestors and descendants share the same space, in which case the ancestors may take precedence over the descendants, and more recent descendants may take precedence over older descendants. When a copy of a volume 302 is made, the copy may inherit the ancestors of the volume 302 it is copied from. This may be accomplished by copying the ancestor records and appending a new ancestor record for the copy action that has been taken. Descendant records may not be inherited by the copy.

If two volumes 302 share an origin identifier, their origin journals may be compared to see if the two volumes 302 are distinct branches of the original data, or if one is an unmodified historical copy of the other. Their origin journals may also be compared to identify the latest common ancestor. This information may be used to understand whether two volumes form a disaster recovery (DR) relationship, and an approximation of the RPOs with respect to each other. If access may be obtained to every volume from the origin identifier through which data may be written, an approximation of the RPO may be obtained with respect to host writes.

One may also determine if there are any volumes 302 from an origin identifier for which access cannot be obtained by examining the descendant records in the origin journals of the volumes for which access can be obtained. When a copy is deleted, metadata in the immediate ancestor and any immediate descendants that refer to the deleted copy may be updated to indicate that the copy no longer exists.

Ancestor records may be stored in chronological order, starting with an original volume 302, and then listing a sequence of descendant volumes leading directly to a volume 302 in question. Thus a snapshot of a volume 302 replicated from another system may have three ancestor records: the original volume, the replicated volume, and finally the snapshot volume.

Descendant records may also be stored in chronological order, starting with the latest copy generated from the volume 302, and then listing each other copy from youngest to oldest. If there is insufficient space in the metadata for all copies of the volume 302 that have been made, any references to deleted copies may be omitted. References to the oldest copies may also be omitted. This may be performed since there are more opportunities for optimization with newer copies, as the data will tend to be more similar, and users are more likely to want to reconcile recently made copies.

When a storage system 110 accesses its volumes 302 when it is started, either for the first time, after new volumes 302 are added, or after significant system metadata has been lost, the storage system 110 may scan the origin records of all of its volumes 302, and may record a cache of the volumes 302 in system memory for ease of access. These volumes 302 may be shared with any other connected storage systems, so that all storage systems understand what volumes 302 are present. All volumes 302 sharing an origin identifier may be considered together. A tree (also called an "origin tree" herein) may be constructed describing the relationships between the volumes 302.

Remote replication may be reconstituted where all volumes 302 involved exist, and they may be made available for disaster recovery. Similarly, high availability relationships may be reconstituted and re-enabled. If point-in-time copies are made and the differences stored in a thinly-provisioned volume, the pattern of regions that are allocated may be used to piece together the original consistent data of the snapshot, which in turn may be reconstituted and made available.

If a volume's data is lost, the data may be recovered by understanding the missing volume's relationships with other volumes 302 and determining if there is another volume 302 that shares enough origins to contain the same data. This enables rapid import and export of multiple volumes 302 from storage systems 110, as well as rapid system disaster recovery, while restoring relationships between volumes 302.

In order to understand which regions differ between two volumes 302 without having to read all data in the volumes 302, functionality may be provided to understand regions that are common between volumes 302. In certain embodiments, this functionality may include implementing a concept known as a region origin identifier (ROI). One ROI may be maintained for every region of a volume 302. A region may be any size from a single sector or track to a megabyte or more. The size of region may be fixed by a particular implementation or may be selected by a user. The smaller a region, the greater overhead an ROI will place on a storage system 110, but the finer the granularity will be for understanding common regions.

ROIs may, in certain embodiments, be stored with volume data in a storage system 110. The storage system 110 may, in certain embodiments, arrange the ROIs such that they are spread across physical disks, and they may be arranged contiguously. Two modes may be used for the ROIs. When an ROI is updated in response to its corresponding region being updated, the update of the ROI will ideally not impact the update of the region. Similarly, when ROIs of a volume 302 are read en masse to discover which regions match those of another volume, the volume's ROIs are ideally read as quickly as possible. One way to provide both of these characteristics is to add an additional element to a RAID array or arrays in which the data is stored. Specifically, an element in each stripe of a RAID may be used to store the ROIs, rotating the element used for each stripe in turn. The physical location of ROIs on a single physical disk may be packed to obtain the fastest read speed.

An ROI may, in certain embodiments, include a volume identifier under which the region was last modified, together with a revision identifier that uniquely identifies a version of data present in the region. This revision identifier may in certain embodiments be a hash of data in the region itself or any other identifier that is unique within the region to that update. For example, the revision identifier may be derived from a current value of a 64-bit count of a number updates to data in a region since the system started. It's not necessary to be able to infer ordering from revision identifiers, just whether they are different.

On a new volume, the ROIs may all be zero to indicate that the corresponding regions are uninitialized. As a region is updated, the corresponding ROI may be updated to a new value that contains the volume identifier and a new revision identifier. If data in a region is copied to another volume 302 by a storage system 110 as part of a point-in-time or continuous copy, the target region's ROI may in certain embodiments be updated to exactly match that of the source region.

When synchronizing two volumes 302, the ROIs of matching regions may be read. If they are the same, the regions do not need to be replicated since they are already synchronized. Thus, having identified an imported volume 302 as an earlier copy of a volume 302 on a remote system, the ROIs may be used to determine which regions have changed in order to synchronize them. If an ROI is sixteen bytes long, describing a region perhaps a megabyte long, comparing ROIs will take orders of magnitude less time than reading and comparing the data itself, enabling rapid resynchronization of very similar volumes 302.

It is worth noting that there is only value in comparing ROIs between volumes 302 with common ancestry. Where a block order is not common between two volumes 302, greater intelligence is needed to perform a region matching process. For example, where one volume 302 is a copy of part of another volume 302, the change in block addressing as part of the copy process may be considered when comparing the copies and descendants of the copies. Likewise, if a copy is transformed by a compression or thin-provision algorithm, comparing ROIs of regions may only be possible if regions can be mapped across the transformation. If a transformation packs data from multiple regions together, it may no longer be possible to compare volumes 302 from before and after the transformation unless ROIs are maintained for the full uncompressed data.

On the first write to a region following a volume 302 being created (from scratch or from an existing volume 302) or imported, the ROI may be modified to a value guaranteed to be unique before the write is allowed to modify the region. If a storage system 110 does not know whether a write is the first to a region since the volume 302 was created or imported (e.g., the system had a power failure or otherwise lost its system state), the write may be treated as if it were the first to the region. This ensures that a region with different data will have a different ROI. Updating the ROI for subsequent writes to that region may be performed in a more lazy manner or entirely omitted. In certain embodiments, an ROI must be historically unique for a region of a volume 302. There is no requirement to have different ROIs for different regions of a volume, but it's typically not acceptable to reuse a ROI for a region.

Systems and methods in accordance with the invention may enable partial recovery of a volume 302 even absent a source volume 302. As one of the uses of embodiments of the invention is to enhance recovering a storage system 110, read/write access may not immediately be provided to all volumes. For example, there may need to be hardware replacement or other recovery actions on physical storage devices on which one or more volumes are stored. Early resynchronization of volumes may be started using ROIs in the absence of a source volume if other volumes can be identified that share common ancestry with the volume 302 that is being recovered.

For example, if a region on a volume currently contains data from generation 5, and we are attempting to resynchronize it from a currently-offline volume currently containing data generation 7, one may be able to identify other volumes containing data with a common ancestry with data generation 7, and copy that data instead. This data may be located on many such volumes, for example alternative volume A1 may contain data from the correct generation on regions 0 and 1, while alternative volume A2 may contain data from the correct generation on regions 2 and 3. Such identification of replicable data may enable the resynchronization process to be started in the absence of a source volume, even if it cannot be completed until the original source volume is restored. The synchronization process will ideally have progressed towards the goal of full resynchronization. The presence of multiple volumes containing data from the same source and generation is common in systems that permit many point-in-time copies to be taken and then replicated to a remote system.

Even if an identical data generation cannot be found from which to replicate data, there may be a similar volume that can be used instead. This would be one that is more closely related to the (offline) preferred source volume than the destination volume to which data is being copied. When the preferred source volume becomes available, the destination volume will most likely be closer to the state of the source volume. As long as the replication system is able to identify what data matches, for example by using a hash-based comparison on areas of the volume smaller than the regions associated with the ROIs, any regions on the target volume that can be identified as being more similar to the preferred source volume will need less synchronization effort to make them match.

For example, consider two continuous copies of volume A created for disaster recovery stored on volume B and volume C. Assume that volume B was updated later than volume C. Such a scenario may occur if a rolling disaster takes volumes C, B, and A offline in turn. In the absence of volume A, the ROIs and origin journals of volumes B and C may show that volume B has newer data from volume A than volume C, and may be used to update volume C with regions modified on volume A after volume C stopped being updated. This will not directly result in a volume that can be used for disaster recovery as its data will not be consistent, but it is in a state that will significantly accelerate the eventual resynchronization of volume A with volume C.

Referring to FIGS. 4A through 8, an example is provided showing how ancestry and descendant information may be maintained for volumes. FIG. 4A shows an origin journal for a freshly created volume 302 (i.e., volume with volume identifier ID0001). The last record in the ancestor records (referred to herein as the current state record (CSR)) describes the current state of the volume 302. Upon initial creation, volume ID0001 has a data generation of "0" meaning that there have not been any writes to the volume since its initial creation. The data generation will be updated to "1" when it receives its first write since the state of the data will change relative to its initial creation. If volume ID0001 was created by copying it from a source volume, the origin journal of the source volume would be used in lieu of the origin journal illustrated in FIG. 4A.

FIG. 4B shows an origin journal for volume ID0001 after a point-in-time copy is made of volume ID0001 while at data generation 1. Assume that the point-in-time copy creates a volume with volume identifier ID0002, as shown in the origin journal of volume ID0001. As shown in FIG. 4B, ancestors for volume ID0001 are show at the top of the origin journal and descendants of volume ID0001 are shown at the bottom of the origin journal. This convention is used in FIGS. 4A through 8. As further shown in the origin journal of FIG. 4B, the data generation of the CSR of volume ID0001 has been updated to 2 since the volume has been modified since the point-in-time-copy operation was performed.

FIG. 5A shows the origin journal for volume ID0002 (which was created by taking a point-in-time copy of volume ID0001). As shown in FIG. 5A, at the time of the point-in-time copy of volume ID0001, the data generation of volume ID0001 was "1". This is indicated in the origin journal of volume ID0002. As further shown in the origin journal of volume ID0002, volume ID0002 has not been modified since the point-in-time copy was created, since its data generation is "1". If and when volume ID0002 is modified, its CSR will have its data generation advanced to 2. This data generation will be distinguishable from the data generation of volume ID0001 as the origin journal shown in FIG. 4B shows that the volumes were last common when volume ID0001 had a data generation of 1.

FIG. 5B shows the origin journal of volume ID0001 after a second point-in-time copy is made of volume ID0001 while at data generation 2. As indicated in the origin journal, this second point-in-time copy creates a volume with volume identifier ID0003. In this example, volume ID0001 has not been modified since the second point-in-time copy was taken, so the data generation for volume ID0001 is still 2. The origin journal further shows that a continuous copy operation has been started onto volume ID0004, but while it is incomplete, it does not have a valid data generation. Starting the continuous replication process did not increment the CSR's data generation, as there is no need to distinguish the data on volume ID0004 from that on volume ID0001.

FIG. 6A shows the origin journal of volume ID0001 after the continuous copy operation to volume ID0004 has completed, and some additional writes have been applied to volume ID0001. The completion of the continuous copy operation did not increment the CSR's data generation. Rather, the data generation was incremented in response to additional writes to volume ID0001 after the copy to volume ID0003 was made. Note that while the replication to volume ID0004 is ongoing, it's data generation is maintained as the same as the CSR of volume ID0001. If volume ID0001 is modified without replicating the changes to volume ID0004, this will set the ID0004 descendant record's data generation to the CSR's current data generation, and then increment the CSR's data generation. This is important to distinguish the data on volume ID0004 at the point where replication stopped from the state of volume ID0001 after later modifications.

FIG. 6B shows the origin journal of volume ID0004 at the same point in time as FIG. 6A. The ancestor records show that this is a continuous copy of volume ID0001. The fact that the data generations listed for volumes ID0001 and ID0004 are the same means that volume ID0001 and volume ID0004 are the same as far as the storage system 110 containing volume ID0004 knows. The data generation for ID0001 in the origin journal of volume ID0004 is updated whenever possible from the CSR of volume ID0001's origin journal.

FIG. 7A shows the origin journal of volume ID0001 after stopping the continuous copy operation to volume ID0004 while ID0001 was at data generation 3. As shown in FIG. 7A, some additional writes were made to volume ID0001, causing it to transition to data generation 4. If replication to volume ID0004 is resumed and completed, the descendent record for volume ID0004 may then be updated to 4.

FIG. 7B shows the origin journal for volume ID0004 at the same point in time as FIG. 7A, when replication was stopped to volume ID0004, and writes were applied to volume ID0001. In this Figure, one can observe that some writes were applied to volume ID0004 after replication was stopped, as the ancestor records for volume ID0004 show that this volume originated as a continuous copy of volume ID0001 while at data generation 3, and was later modified to result in volume ID0004 having a data generation of 4. Note that although both volumes ID0001 and ID0004 have a data generation of 4, these are unique generations as they have different histories. The origin journals for these two volumes may be considered together to ascertain that the most recent common ancestry for volumes ID0001 and ID0004 was at data generation 3.

FIG. 8 shows the origin journal for volume ID0004 after replication is resumed and completed from volume ID0001 while volume ID0001 is at data generation 4. Once the replication is completed, the data generation of volume ID0001 is copied from the origin journal of volume ID0001 to the origin journal of volume ID0004. Thus, the origin journal of volume ID0004 shown in FIG. 8 shows that volume ID0001 and volume ID0004 now share a more recent common point in history (i.e., when volume ID0001 was at data generation 4).

FIGS. 9A through 9D shows how region origin identifiers (ROIs) may be used to determine which regions are common between volumes 302. FIGS. 9A through 9D show ROIs maintained for volume ID0001 and volume ID0002. In the illustrated examples, ROIs are only shown for three regions (e.g., tracks, groups of tracks, etc.) in each of the volumes, where each row corresponds to a different region in the volumes. In a real-world implementation, however, many more rows would be used to represent many more regions.

As shown in FIG. 9A, when volumes ID0001 and ID0002 have just been created, the data contained therein is in its original state. Thus, each ROI is listed with data generation "0" to indicate that this data was generated when the volumes were at data generation "0". In FIG. 9B, upon writing to the first region of volume ID0001, the first row (i.e., ROI) is updated to data generation "1" to reflect that the update was made when volume ID0001 was at data generation "1". The second and third rows, however, maintain data generation "0" to indicate that they have not yet been updated. Similarly, the third region in volume ID0002 is shown with data generation "1" since it was written to when volume ID0002 was at data generation "1".

Referring to FIG. 9C, when a snapshot is taken of volume ID0001 to create volume ID0002 (assuming that, at the time of the snapshot, the ROIs for volume ID0001 appear as they do in FIG. 9B), the data from volume ID0001 is copied to volume ID0002. As a result, as shown in FIG. 9C, the ROIs for volume ID0002 reflect those from volume ID0001 in FIG. 9B. If data in volume ID0001 is lost, data in volume ID0002 may be used to restore data in volume ID0001. The ROIs in volume ID0001 and volume ID0002 may be used to determine which data in volume ID0002 was common with volume ID0001 at the time volume ID0001's data was lost. Common data may be used all or in part to restore data in volume ID0001.

FIG. 9C further shows that after the snapshot is taken of volume ID0001 and stored in volume ID0002, further writes are made to volume ID0001 while this volume is at data generation 2. Thus, the first and third regions of volume ID0001 show they were updated at data generation 2.

Assuming that the snapshot stored in volume ID0002 is writeable (i.e., may be written to), FIG. 9D shows the ROIs for volume ID0001 and volume ID0002 after they have received additional writes. For example, FIG. 9D shows that the first region of volume ID0001 has been updated while volume ID0001 was at data generation "3" and the first and third regions of volume ID0002 have been updated while volume ID0002 was at data generation "2". As shown in FIG. 9D, the ROIs for the second region of both volume ID0001 and volume ID0002 are the same. Thus, in the event volume ID0001 needs to be synchronized with volume ID0002, or vice versa, the second region of each volume would not need to be synchronized since they both store the same data. The ROIs maintained for each of these volumes enable this improvement in efficiency. In short, systems and methods in accordance with the invention enable the common history of two volumes to be understood, while identifying modified regions, in order to facilitate rapid resynchronization or reestablishment of relationships between volumes.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to efficiently synchronize a secondary volume with a primary volume, the method comprising:
   maintaining a primary volume on a primary storage system;
   creating a copy of the primary volume;
   maintaining first ancestry information for the primary volume and second ancestry information for the copy, the first ancestry information describing a source volume from which data in the primary volume originated, and the second ancestry information describing a source volume from which data in the copy originated;
   physically transporting the copy and associated second ancestry information from the primary storage system to a secondary storage system;
   loading the copy into a secondary volume of the secondary storage system and importing the second ancestry information of the copy into the secondary volume;
   analyzing the first ancestry information and second ancestry information to determine if the primary volume and secondary volume share common ancestry;
   in the event the primary volume and secondary volume share common ancestry, analyzing the first ancestry information and second ancestry information to determine differences between the primary volume and the secondary volume; and
   synchronizing the secondary volume with the primary volume to reconcile the differences.

2. The method of claim 1, wherein the first ancestry information includes a first unique volume identifier for the primary volume and the second ancestry information includes a second unique volume identifier for the copy.

3. The method of claim 1, wherein creating a copy comprises importing at least part of the first ancestry information into the second ancestry information.

4. The method of claim 1, wherein creating a copy comprises creating a point-in-time copy.

5. The method of claim 1, wherein the first ancestry information comprises a first origin journal describing ancestors of the primary volume.

6. The method of claim 5, wherein the second ancestry information comprises a second origin journal describing ancestors of the copy.

7. The method of claim 6, wherein the first origin journal and second origin journal keep track of changes to regions of the primary volume and secondary volume respectively.

8. A computer program product to efficiently synchronize a secondary volume with a primary volume, the computer program product comprising a non-transitory computer-readable storage medium having computer-usable program code embodied therein, the computer-usable program code configured to perform the following when executed by at least one processor:
 maintain a primary volume on a primary storage system;
 create a copy of the primary volume;
 maintain first ancestry information for the primary volume and second ancestry information for the copy, the first ancestry information describing a source volume from which data in the primary volume originated, and the second ancestry information describing a source volume from which data in the copy originated;
 load the copy into a secondary volume of a secondary storage system and import the second ancestry information of the copy into the secondary volume;
 analyze the first ancestry information and second ancestry information to determine if the primary volume and secondary volume share common ancestry;
 in the event the primary volume and secondary volume share common ancestry, analyze the first ancestry information and second ancestry information to determine differences between the primary volume and the secondary volume; and
 synchronize the secondary volume with the primary volume to reconcile the differences.

9. The computer program product of claim 8, wherein the first ancestry information includes a first unique volume identifier for the primary volume and the second ancestry information includes a second unique volume identifier for the copy.

10. The computer program product of claim 8, wherein creating a copy comprises importing at least part of the first ancestry information into the second ancestry information.

11. The computer program product of claim 8, wherein creating a copy comprises creating a point-in-time copy.

12. The computer program product of claim 8, wherein the first ancestry information comprises a first origin journal describing ancestors of the primary volume.

13. The computer program product of claim 12, wherein the second ancestry information comprises a second origin journal describing ancestors of the copy.

14. The computer program product of claim 13, wherein the first origin journal and second origin journal keep track of changes to regions of the primary volume and secondary volume respectively.

15. A system to efficiently synchronize a secondary volume with a primary volume:
 at least one processor;
 at least one memory device operably coupled to the at least one processor and storing instructions for execution on the at least one processor, the instructions causing the at least one processor to:
  maintain a primary volume on a primary storage system;
  create a copy of the primary volume;
  maintain first ancestry information for the primary volume and second ancestry information for the copy, the first ancestry information describing a source volume from which data in the primary volume originated, and the second ancestry information describing a source volume from which data in the copy originated;
  load the copy into a secondary volume of a secondary storage system and import the second ancestry information of the copy into the secondary volume;
  analyze the first ancestry information and second ancestry information to determine if the primary volume and secondary volume share common ancestry;
  in the event the primary volume and secondary volume share common ancestry, analyze the first ancestry information and second ancestry information to determine differences between the primary volume and the secondary volume; and
  synchronize the secondary volume with the primary volume to reconcile the differences.

16. The system of claim 15, wherein the first ancestry information includes a first unique volume identifier for the primary volume and the second ancestry information includes a second unique volume identifier for the copy.

17. The system of claim 15, wherein creating a copy comprises importing at least part of the first ancestry information into the second ancestry information.

18. The system of claim 15, wherein the first ancestry information comprises a first origin journal describing ancestors of the primary volume.

19. The system of claim 18, wherein the second ancestry information comprises a second origin journal describing ancestors of the copy.

20. The system of claim 19, wherein the first origin journal and second origin journal keep track of changes to regions of the primary volume and secondary volume respectively.

* * * * *